May 15, 1934. J. A. CAMPBELL 1,959,155
CEMENT DISTRIBUTING MACHINE
Filed Oct. 28, 1932
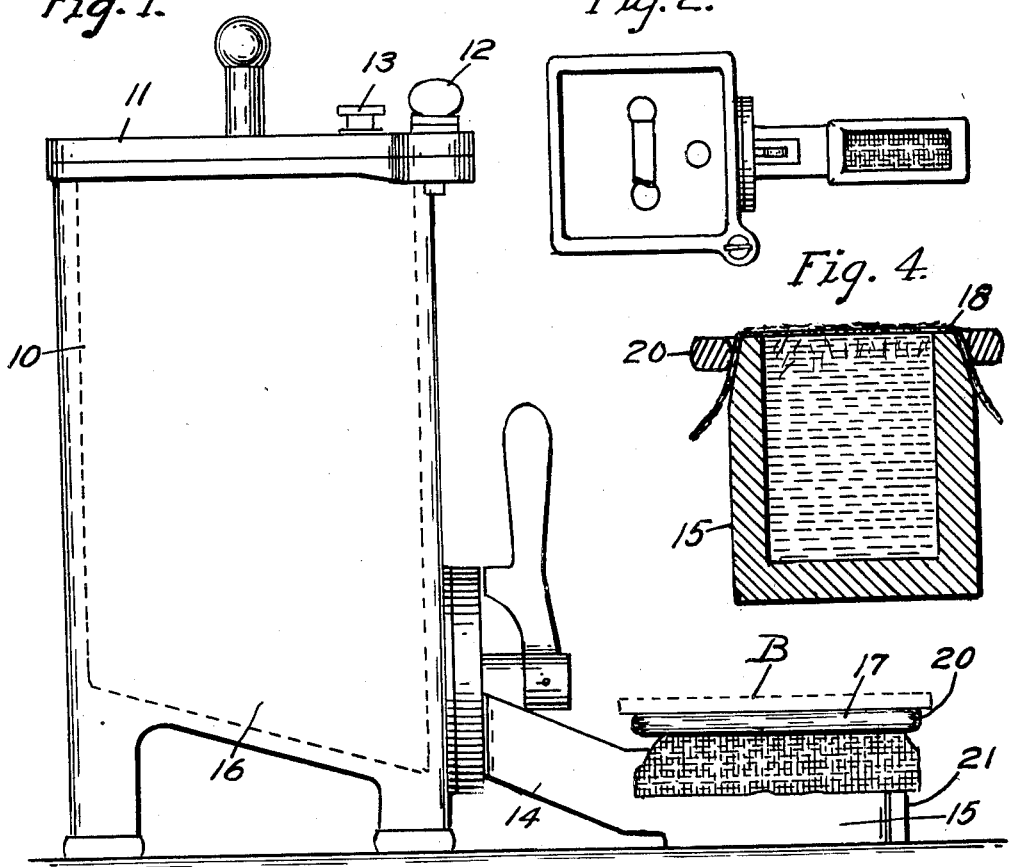
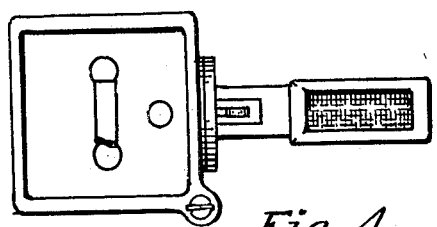
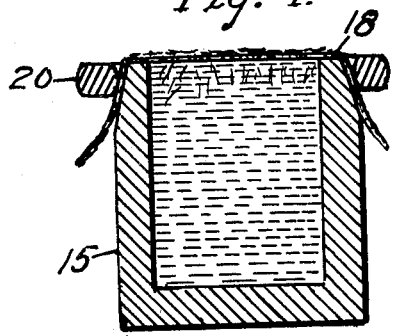
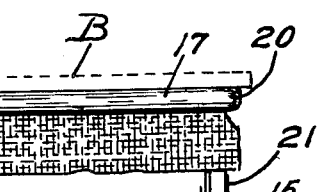
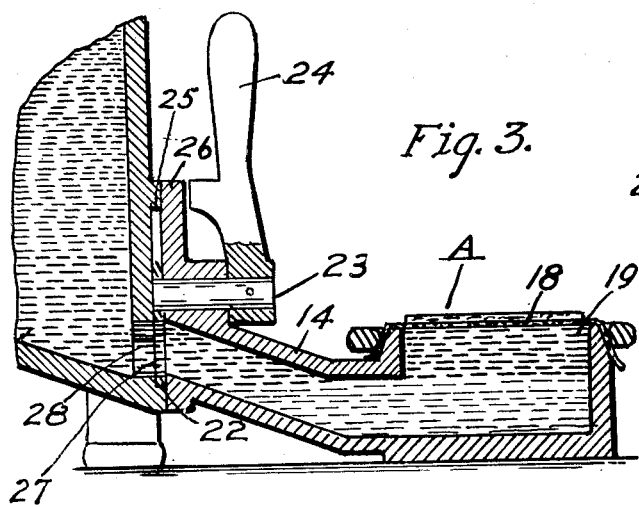
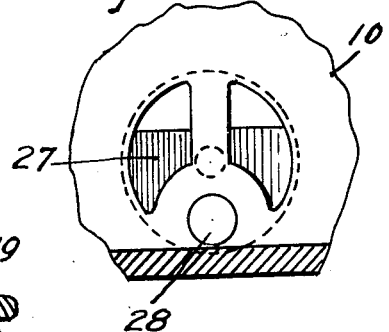
Inventor,
John A. Campbell,
by Henry J. Marks.
Attorney.

Patented May 15, 1934

1,959,155

UNITED STATES PATENT OFFICE 1,959,155

CEMENT-DISTRIBUTING MACHINE

John A. Campbell, Manchester, N. H., assignor of one-half to Dennis F. Marks and Alexander J. McCormick, Lynn, Mass.

Application October 28, 1932, Serial No. 640,115

2 Claims. (Cl. 91—47)

My invention relates to cement-distributing machines of the gravity or pressure type, in which the cement is carried into a distribution chamber having an orifice covered with gauze, through which the cement is permitted to ooze due to the gravity or pressure and is distributed on top of the gauze in predetermined amounts. My object in supplying a coating of cement upon the gauze is to provide a uniform, regulated amount of cement which may be wiped off by any article applied to the gauze in a wiping motion, which article is intended to have an adhering surface.

I attain this object by the mechanism illustrated in the accompanying drawing, in which:—

Figure 1 is a side elevation of the machine.

Figure 2 is a plan view of the same.

Figure 3 is a cross-section of the distribution chamber extending into the supply chamber, showing the valve construction.

Figure 4 is a cross-section through the distribution chamber showing the means for securing the gauze in position.

Figure 5 is a fragmentary view looking inside the supply chamber, showing the valve.

Referring to the drawing, in detail, which illustrates my improved cement-distributing machine. The numeral 10 indicates the supply chamber for the cement supply. The casing of the said supply chamber is provided with suitable pedestals and a cover, 11. The cover is pivotally secured to the casing and is controlled by a wing nut, 12. There is an air vent, 13, also in the cover to allow the air to enter the chamber or prevent it from entering, according to the working conditions and controlling of cement in its distribution. The cement in the supply chamber is led down the chute, 14, to the distribution chamber, 15, by the inclined plane, 16, forming a part of the supply chamber. The distribution chamber, 15, and depending members are the main embodiment of the invention and consist of a rectangular tapered edge form on the upper part of the distribution chamber, over which a gauze member, 18, is placed, fully covering the aperture, 19, and held rigidly in position by the rectangular yoke 20. By this construction, the cement from the supply chamber is led down the chute, 14, into the chamber, 15, and oozes up through the gauze, 18. By this operation, a film of cement is delivered to the top of the gauze by the gravity of the cement following the inclined plane, 16.

The downward movement of the member, 20, is limited by the stop, 21. Different thicknesses of cement can be carried to the top of the gauze, not only by gravity, but by pressure and these thicknesses are controlled according to their viscosity, and the supply needed by the valve, 22. The valve, 22, is mounted on the shaft, 23, and operated by the lever, 24. In operating, the valve, 22, rotates in a recess, 25, formed in the casing of the supply chamber, 10, and held packing tight by a disc, 26, held in position by screws. Formed in the valve is a hole, 27, which allows the cement from the supply chamber to pass out through the hole, 28, in the chamber, and the hole, 27, in the valve and thus through the chute, 14, to its distribution point on the gauze.

When sufficient cement is located on the gauze, cement can be applied, by hand or machine, to any article, A, to be operated on, with quickness and dispatch and with no danger of inefficiency, through leakage or waste, by reason of over supply.

When the machine is not in use, a cover, B, is used as shown in Figure 1 in dotted lines. At such times, it becomes necessary to make the machine air-tight and this is accomplished by the cover, 11, being screwed rigidly in position by the wing nut, 12, by the cover, B, being placed over the gauze and by the air-vent, 13, being screwed tightly into the cover, 11. By these mechanical means, not only is air prevented from circulating inside the machine, but the machine is rendered air-tight and the cement within cannot harden.

Having thus explained my new machine, without attempting to describe all of the forms in which it may be made, what I claim is new and desire to secure by Letters Patent of the United States is:

1. In a cement-distributing machine, having a gravity or pressure supply head of cement, a distribution chamber leading into the supply, an orifice in the top of the distribution chamber, gauze covering said orifice, tapered edges formed on the distribution chamber and a rectangular yoke super-imposed over the gauze which wedges it in rigidly over the tapered edges.

2. A cement-distributing machine comprising a container having a recess formed in the side thereof, a rotary valve formed with a hole therein mounted in said recess, a shaft for said valve, a lever on said shaft for operating the same, means forming a chamber associated with said container and having an orifice in the top thereof, and means connecting the container and chamber means whereby operation of the valve allows cement to flow by gravity or pressure head into the distribution means.

JOHN A. CAMPBELL.